(No Model.) 2 Sheets—Sheet 1.
J. B. ROOT.
DOUBLE CYLINDER STEAM ENGINE.
No. 256,054. Patented Apr. 4, 1882.
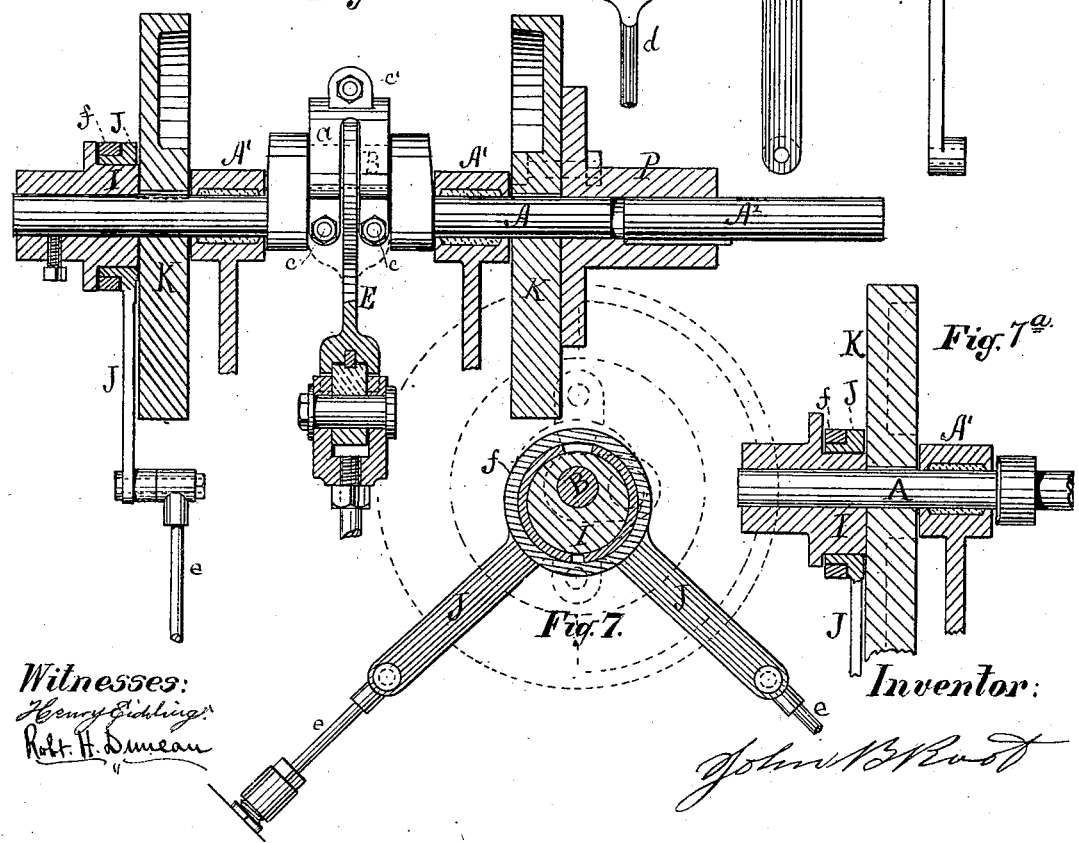
Witnesses:
Henry Eichling
Robt. H. Duncan
Inventor:
John B Root (No Model.) 2 Sheets—Sheet 2.
J. B. ROOT.
DOUBLE CYLINDER STEAM ENGINE.
No. 256,054. Patented Apr. 4, 1882.
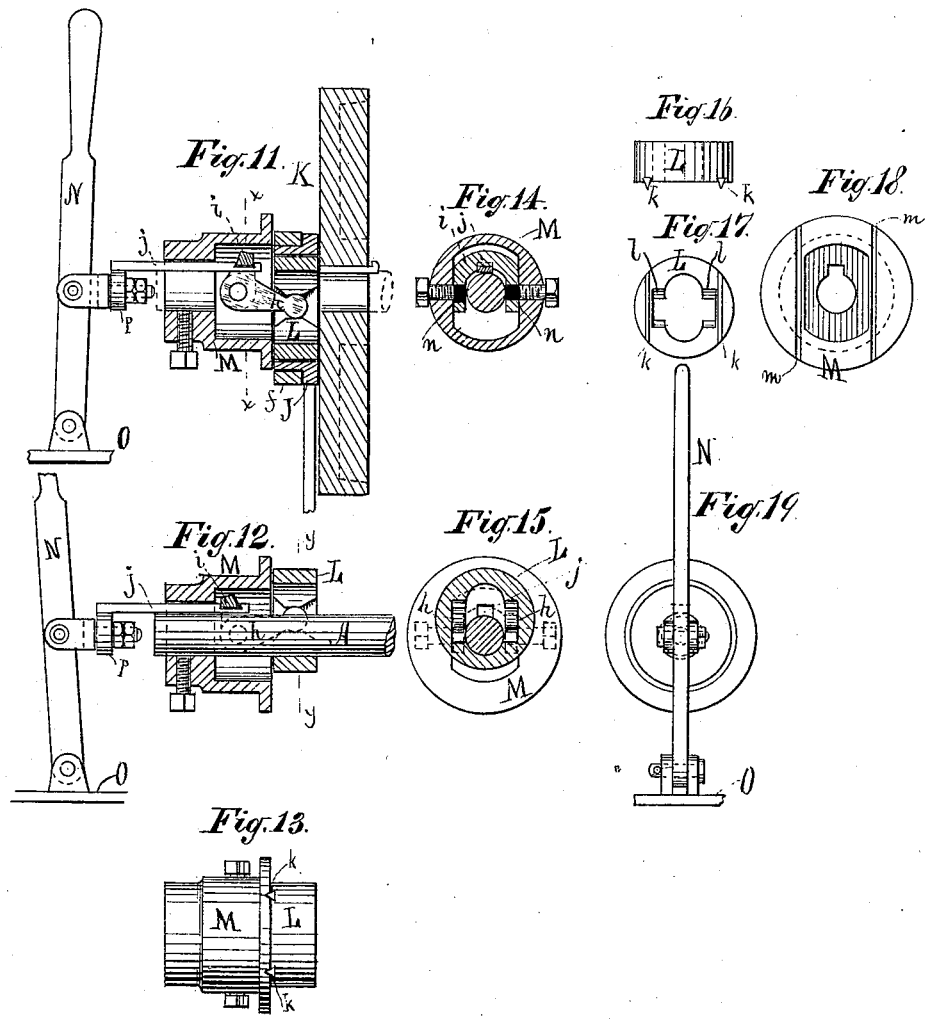
Witnesses:
Henry Eichling
Robt. H. Duncan
Inventor
John B. Root

UNITED STATES PATENT OFFICE.

JOHN B. ROOT, OF PORT CHESTER, NEW YORK.

DOUBLE-CYLINDER STEAM-ENGINE.

SPECIFICATION forming part of Letters Patent No. 256,054, dated April 4, 1882.

Application filed January 31, 1881. (No model.)

*To all whom it may concern:*

Be it known that I, JOHN B. ROOT, of Port Chester, in the county of Westchester and State of New York, have invented a new and useful Improvement in Double-Cylinder Steam-Engines, of which the following is a specification.

This invention relates to improvements in steam-engines having two double-acting cylinders whose pistons reciprocate at substantially right angles with each other; and the object of the invention is, first, to connect the pitmen with the crank in such manner that the duplicate pitmen and piston-rods will reciprocate in the same plane, and to prevent the pounding and overheating of the connected parts; second, to connect the valves with their eccentric in a similar manner for the same purpose; third, to provide double counter-balances on the shaft at equal distances from the crank, whose counterweight shall be equal to the weight of the reciprocating parts of one of the engines, whereby the shock and jar of the reciprocating parts are completely obviated; and, fourth, to provide means for shifting the eccentric of the valves for the purpose of reversing the engines.

The invention is illustrated in the accompanying drawings, in which Figure 1 is a transverse view through the crank, showing the connection of the pitmen, &c. Fig. 2 is a side view of the shaft and connected parts. Figs. 3 and 4 are views in detail of binding-straps. Figs. 5 and 6 are views in detail of the pitmen. Figs. 7 and 7ª are sections, both transverse and longitudinal, of the shaft to represent the connection of the eccentric-rods with their eccentric. Figs. 8 and 9 are views in detail of the valve-connections. Fig. 10 is a side view of the end of the pump-rod. Figs. 11, 12, 13, 14, 15, 16, 17, 18, and 19 are views illustrating the construction and adjustment of the eccentric which works the valves.

In these drawings, A represents the crank-shaft journaled in the standards A' A', and B the crank of an engine with two double-acting cylinders, C C, and with piston-rods D D operating at substantially right angles with each other.

E E are pitmen, connected with cross-heads F F and with the crank B, and G G are guide-frames. The pitmen are constructed and connected with the crank substantially as follows: They are formed by casting or otherwise to the shape shown in Figs 5 and 6, Fig. 5 being a side, and Fig. 6 an edge, view of one of the pitmen. The end to be connected with the crank is formed into somewhat less than a half-circle, as seen in Fig. 5.

Figs. 3 and 4 are views of a binding-strap, *a*, shaped upon its inner wall to fit upon the outer wall of the circular end of the pitman and forming about a half-circle. It is slotted midway of its width to permit the central part of the pitman to project, as seen in Fig. 2. The semicircular ends of the pitmen are placed on the crank, preferably provided with an anti-friction wearing-bushing, *b*, so that they are directly opposite each other, and so that the duplicate pitmen and the piston-rods attached to them will be in the same plane at right angles to the crank-shaft. The binding-straps *a a* are then placed in position and drawn and held together by screw-bolts *c c* and *c'*.

Double-cylinder engines are generally constructed to give a short stroke and to run at a high rate of speed, and for this reason there is great difficulty in making the proper connection between the pitmen and the crank to prevent the knocking or pounding of the parts on the one hand and excessive friction and consequent overheating of the parts on the other hand. In other words, if the pitmen are bound to the crank sufficiently tight to prevent pounding, then overheating is liable to result. The present mode of connecting the pitmen to the crank is designed, among other things, to remedy this difficulty, and is effected by surrounding the crank with a bushing, *b*, of suitable wearing metal, preferably formed in two semicircles with their edges rabbeted together. It is found in practice that the pitmen can be brought and held in contact with such bushing with the necessary tightness to prevent the parts from pounding upon each other and at the same time without the liability of producing excessive friction.

In the connection described and shown the bushing under the intermittent varying pressure of the semicircular ends of the pitmen will slowly turn upon the crank in the direction of its revolution, and at the same time the ends of the pitmen will slide back and forth within the range of their movement over the surface of the bushing, whereby the friction will be distributed between the inner and outer wall of the bushing and the adjacent parts. It is not necessary that the bushing should closely fit the crank, because the united pressure of the circular ends of the pitmen will, even though the bushing is somewhat loose or has some play on the crank, keep it in continuous contact with the crank during its revolution, and thus prevent pounding and consequent jar between the bushing and the crank.

$d$ is the pitman of a pump, H, whose forked end (shown in Fig. 10) is held between the lower edges of the straps $a\ a$ by means of the bolts $c\ c$. This connection effectually prevents the straps from turning upon the crank and also affords a convenient attachment for the pitman $d$.

Instead of being connected with a pump, the pitman $d$ may be used to work any other machine, or its lower end may simply reciprocate in suitably constructed guides which will keep it in position to hold the binding-straps $a\ a$ in place.

In Figs. 2 and 7, I is an eccentric secured to the shaft A, with which are connected the eccentric-rods J J, to which in turn the valve-rods $e\ e$ are pivoted. The rods J J are shown in Figs. 8 and 9, and are similar in construction to the pitmen E E, and for a similar purpose—that is, to permit the duplicate rods and their connections to reciprocate in the same planes. $f$ is a binding-ring, which holds the semicircular ends of the eccentric-rods upon the eccentric.

I am aware that the pitmen of three or more single-acting cylinders have been connected in the same plane to the crank by means of binding-straps, a friction-bushing being sometimes interposed. In such cases a considerable space must be left between the ends of each pitman to permit of the required movement on the crank or bushing, and the wearing-surface is decreased with the increase of the number of pitmen thus connected. In such cases, also, the force is applied entirely by successive thrusts or pushes of the several pitmen against the crank or bushing, while in my invention the force is applied both by the push and the pull of each of the pitmen alternately, the push being upon the bushing and the pull being upon the binding-straps, and communicated to the pitman to increase its push, the semicircular end of each pitman extending sufficiently around the bushing to receive the pull of the other pitman upon the binding-straps, and at the same time to sufficiently fill the space between the bushing and the binding-straps. The same principle of operation applies to the eccentric-rods J J in their semicircular connecting ends with the eccentric I.

K K are counterbalance-wheels, secured to the shaft at equal distances from the crank. These wheels are formed with depressions in their faces, extending about half-way around them, leaving one half of each wheel so much heavier than its other half that their combined counterweight will counterbalance the reciprocating parts of one of the engines, and thus counteract the momentum of the reciprocating parts of each engine in turn, and prevent the jarring and shaking of the engine when run at high speed. The side of one of the counterbalance-wheels K K serves as a face against which the semicircular ends of the eccentric-rods work, they being held in this position by the flange on the eccentric I, while the other counterbalance-wheel may serve as a coupling for the continuation of the shaft A.

I am aware that counter-balances have been applied to the crank-shaft of engines having a single double-acting cylinder; but in such cases there can be no perfect balance produced, the balance-weights serving only to change the direction of the shock from the line of reciprocation to one at right angles thereto, while in engines having two pistons reciprocating at right angles to each other the counter-weights equal to the reciprocating parts of one of the engines will produce a perfect balance, and relieve the engine from all shock and jar which would otherwise result from the stopping and starting of the reciprocating parts.

It will be seen that by connecting the pitmen of a double-cylinder engine with the crank and the eccentric-rods with their eccentric, substantially as described and shown, so that they and their attached parts will reciprocate in the same planes, the jar and unequal strain which results from the usual way of connecting those parts by straps passing round the crank or eccentric and located laterally of each other, or by other means by which the corresponding parts of the two engines reciprocate in different planes, is entirely prevented.

P is a long sleeve bolted to one of the counterbalance-wheels, and serves as a coupling for the shaft $A^2$.

Figs. 11 to 19, inclusive, on Sheet II of drawings, show devices for shifting the eccentric L, which works the valves for the purpose of reversing the engines. Figs. 11 and 12 are sectional views of the eccentric and connected parts, showing the eccentric as shifted from one extreme of movement to the other upon the shaft. This adjustment of the eccentric on the shaft is effected by the action of levers $h\ h$, projecting from a yoke, $i$, pivoted within a sleeve, M, secured to the shaft. The levers $h\ h$ are operated by the lever-arm N, stationed beyond the shaft and pivoted to a support, O, and connected to the yoke $i$ by the rod $j$ through the swivel-link $p$, pivoted to the lever N. Fig. 13 is a plan view of the eccentric and its adjacent sleeve. Fig. 14 is a section through the line $x\ x$ of Fig. 11, and shows the pivoted yoke $i$ and its connection with the rod $j$. Fig. 15 is a sectional view through the line $y\ y$ of Fig. 12, and shows the levers $h\ h$ as having raised the eccentric to the extreme reversed position from that shown in Fig. 11. Figs. 16 and 17 are side and face views of the eccentric, showing its guides k k and its inclined walls l l. Fig. 18 is a face view of the sleeve adjacent to the eccentric, showing ways m m, in which the guides k k on the eccentric move. The eccentric is adjusted from the position shown in Fig. 11 to its extreme, as shown in Fig. 12, by simply throwing the handle of the lever N away from the shaft. This rocks the yoke i on its pivoted bearings n n, throws the ends of the levers h h against the walls l l of the eccentric, and moves it along the face of the sleeve M, its path being determined by the guides k k, moving in the ways m m, as well as by the levers h h in their bearing against the wall of the eccentric. A reverse throw of the lever-handle N restores the eccentric to its former position.

What is claimed as new is—

1. In combination with a friction-bushing on the crank of an engine having two double-acting cylinders placed at right angles to each other, two pitmen whose crank ends are semi-circular, and binding-straps, substantially as and for the purpose set forth.

2. In combination with the eccentric of an engine having two double-acting cylinders placed at right angles with each other, eccentric-rods J J, whose connecting ends are semi-circular, and a binding-ring, f, substantially as and for the purpose set forth.

3. In combination with binding-straps, by which the ends of the pitmen are secured to the crank of an engine, an auxiliary pitman, d, whereby the straps are held in position, substantially as described.

4. In combination with the crank-shaft of an engine having two double-acting cylinders at right angles with each other, two counterbalance-wheels whose combined counter-weight is equal to the weight of the reciprocating parts of one of the engines, substantially as and for the purpose described.

5. In combination with a yoke pivoted in the sleeve M and provided with levers h h, a rod, j, and swivel-link p, by which the yoke is connected with the lever N, as means for adjusting the eccentric, substantially as set forth.

JOHN B. ROOT.

Witnesses:
 ROBT. H. DUNCAN,
 BENJ. A. SMITH.